Figure 3:
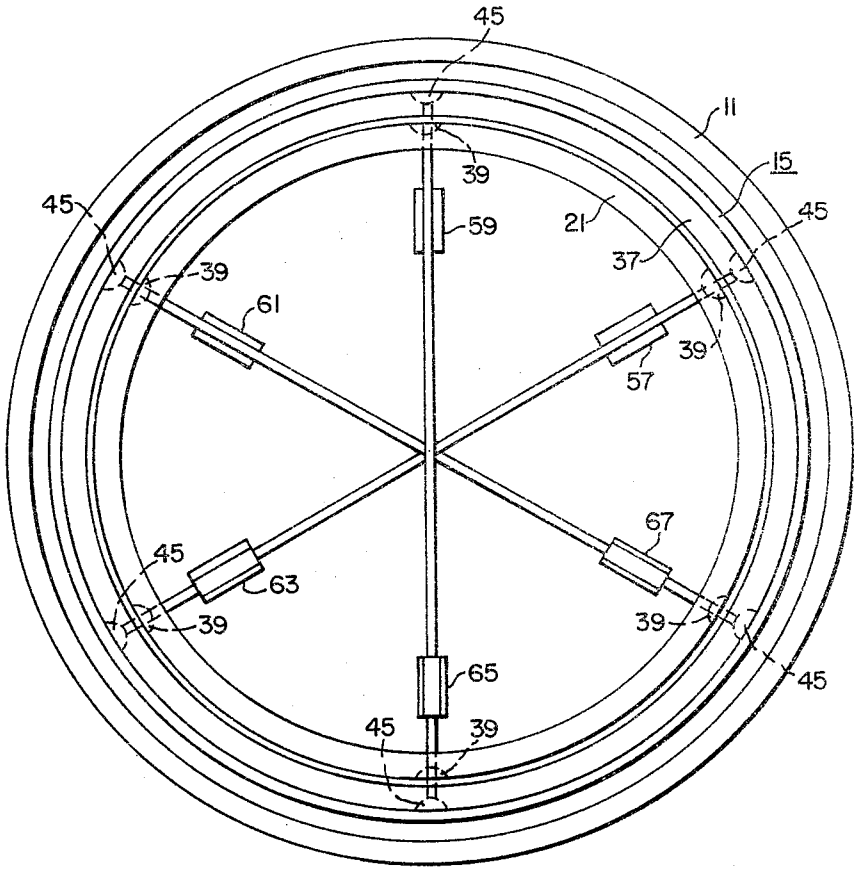
Figure 2:
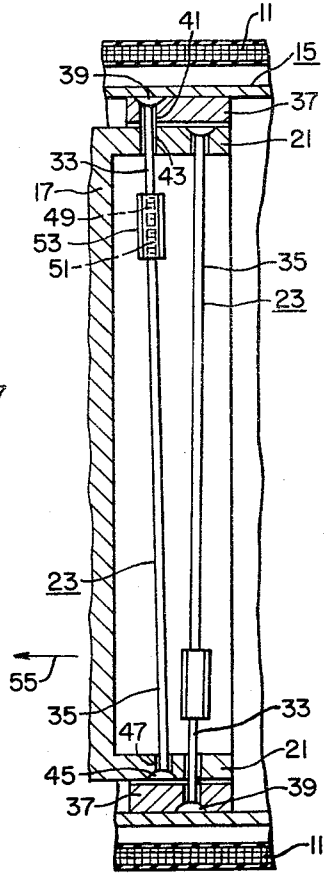
Figure 1:
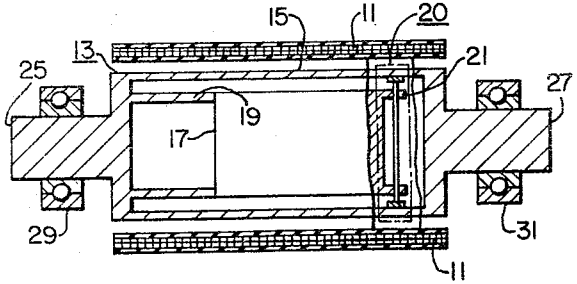

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 7

T934,001
SUPERCONDUCTIVE DYNAMOELECTRIC MACHINE WITH IMPROVED CRYOGENIC SUPPORT ARRANGEMENT

Donald C. Litz, Monroeville, Pa., assignor to Westinghouse Electric Corporation, Pittsburgh, Pa.

Filed Sept. 17, 1973, Ser. No. 398,023
Int. Cl. H02k *9/00*
U.S. Cl. 310—52
1 Sheet Drawing. 18 Pages Specification

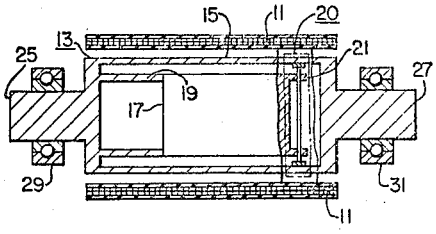

A superconducting dynamoelectric machine has a cryogenic portion of the rotor supported on the ambient temperature portion of the rotor by relatively long and thin spokes. The spokes extend between the ambient temperature portion and a flange located on a cryogenic temperature portion. The materials of the flange and spokes are selected so that contraction of the spokes along their length will be compensated for by contraction of the flange in that direction. Contraction in the transverse direction is compensated for by an appropriate displacement of the end of the spoke connected to the ambient temperature portion. Alignment and tension of the spoke is accurately achieved by an appropriate adjusting arrangement.

SUPERCONDUCTIVE DYNAMOELECTRIC MACHINE WITH IMPROVED CRYOGENIC SUPPORT ARRANGEMENT

Filed Sept. 17, 1973